United States Patent [19]

Griffin et al.

[11] Patent Number: 4,832,976

[45] Date of Patent: May 23, 1989

[54] FROZEN, LOW-SOLIDS, QUIESCENTLY-FROZEN CONFECTION

[75] Inventors: Joseph J. Griffin, Plainsboro; Debra H. Reisinger, East Brunswick; Michael S. Smagula, Plainsboro, all of N.J.; Michael R. Tancredi, Yardley, Pa.

[73] Assignee: General Foods Corporation, White Plains, N.Y.

[21] Appl. No.: 122,998

[22] Filed: Nov. 19, 1987

[51] Int. Cl.$^4$ .................. A23G 9/00; A23G 9/02
[52] U.S. Cl. ................... 426/660; 426/576; 426/573; 426/654; 426/565; 426/566; 426/567; 426/804; 426/548
[58] Field of Search ........... 426/576, 565, 566, 567, 426/804, 548, 660, 554

[56] References Cited

U.S. PATENT DOCUMENTS

| | | | |
|---|---|---|---|
| 2,002,963 | 5/1935 | Schade | 426/565 |
| 3,792,182 | 2/1974 | Carpigiani | 426/565 |
| 4,297,379 | 10/1981 | Topalian | 426/576 |
| 4,297,379 | 10/1981 | Topalian et al. | 426/565 |
| 4,554,169 | 11/1985 | Anderson | 426/565 |
| 4,574,091 | 3/1986 | Steensen | 426/576 |
| 4,574,091 | 3/1986 | Steensen et al. | 426/548 |
| 4,582,712 | 4/1986 | Gonsalves et al. | 426/134 |
| 4,626,441 | 12/1986 | Wolkstein | 426/548 |

*Primary Examiner*—Jeanette Hunter
*Attorney, Agent, or Firm*—T. R. Savoie; D. J. Donovan

[57] ABSTRACT

A low-solids, non-aerated, quiescently-frozen confection having a soft, non-brittle texture is prepared from a composition containing on a weight basis 92 to 96% water, 1 to 2.5% maltodextrin, 1 to 2% glycerin and 0.3 to 0.8% gelatin. The composition can further contain juice solids, food acid and gum stabilizers.

5 Claims, No Drawings

FROZEN, LOW-SOLIDS, QUIESCENTLY-FROZEN CONFECTION

BACKGROUND

This invention relates to high-quality, low-calorie frozen desserts and, more particularly, a frozen, non-aerated, low-solids, quiescently-frozen dessert which has a soft, non-brittle texture and an absence of a gummy or rubbery mouthfeel. The frozen confection composition of this invention is able to maintain its shape on a stick and possesses a pleasing texture and mouthfeel at freezer temperatures.

Frozen novelties is a product area which has undergone rapid expansion in recent years. The use of these products as ready-to-eat desserts or snack items is increasingly prevalent in the home environment. Most of these products are eaten directly from the freezer and are carried on a stick and packaged with a paper wrapper. The consumer merely removes and discards the wrapper, consumes the product, and discards the stick. No utensils or plates are used. Products based on gelatin, pudding, fruit juice or fruit and cream are among products which have recently been popularized.

U.S. Pat. No. 4,297,379 to Topalian et al. discloses dynamically frozen, aerated, gelatin containing products which can contain a variety of ingredients and which can possess a wide range of soluble solids. Due to dynamic freezing and resultant small ice crystal size, aeration and the selection and level of ingredients the Topalian patent produces a smooth, non-icy texture. These products are intended to be distinguished from non-aerated, quiescently-frozen products which possess a brittle, icy texture exemplified by conventional ice pop products. Ice pops have generally been considered to be of low quality due to their coarse, icy texture, their brittle nature which often leads to large pieces breaking away from the stick and their characteristic squeak which is exhibited when these products are bitten into.

Low-calorie frozen confections, such as disclosed in U.S. Pat. No. 4,626,441 to Wolkstein, are known in the art. This patent discloses the use of intensive sweeteners such as aspartame, as a sugar replacement and calls for the use of bulking agents, such as polydextrose, to make-up for lost sugar. The patent states that a mere replacement of sugar by aspartame results in a deleterious effect on the structure of the frozen confection, causing the mouthfeel to be inferior and an inferior product to result.

SUMMARY OF THE INVENTION

In accordance with the present invention a high-quality, non-aerated, low-solids quiescently frozen confection is produced. The benefits of this invention are obtained using a unique combination of ingredients which interact to produce a low-solids (i.e., 4 to 8%), low calorie (i.e., 0.2 to 0.3 cal/g), quiescently-frozen confection which has a soft, non-brittle texture without a gummy texture and which does not exhibit a squeak characteristic when the product is bitten into.

More particularly, the benefits of the invention are derived from a novel combination of maltodextrin, glycerin and gelatin.

DETAILED DESCRIPTION OF THE INVENTION

Glycerin is employed at a relatively high level of from 1 to 2% by weight, preferably about 1.25%, for its known functionality of producing a softer texture at freezer temperatures of about 0° to 10° F. ($-17.7°$ to $-12.2°$ C.). The oiliness or sliminess which would be expected by such levels of glycerin is surprisingly eliminated by a combination of maltodextrin and gelatin at a weight ratio of from at least 2-5:1 and preferably about 3:1. The maltodextrin level is from 1 to 2.5% by weight, preferably about 1.5%. The gelatin level is 0.3 to 0.8% by weight, preferably about 0.5%. The level of maltodextrin should be from 0.5 to 2.5 times the level of glycerin, preferably 1-2:1 and optimally about 1.2:1.

In developing the formulation of this invention, it was found that without the use of maltodextrin it was necessary to employ gelatin at levels in excess of about 1.0% in order to avoid forming excessively brittle products which would survive commercial distribution at an acceptably high level. At these higher gelatin levels, however, the low-solids, frozen confections of this invention possess a gummy or rubbery texture. Surprisingly, it was found that lowering the gelatin level below 0.8% while adding maltodextrin not only eliminated any gummy or rubbery texture but also produced a frozen confection which was sufficiently resistant to cracking to withstand commercial distribution. The resulting frozen confections were also able to be eaten on a stick without portions of the frozen mass breaking and falling to the floor. It was also found that the presence of maltodextrin in the formulation eliminated the squeak sensation that is normally associated with biting into and through quiescently frozen ice pops. The maltodextrin is employed at a level which is at least 1% by weight in order to achieve the desired resistance to cracking and which is 2.5% or less so as to avoid producing a product which is excessively hard and chewy.

The term maltodextrin, as used herein, describes a product derived from the hydrolysis of starch, typically cornstarch, which has a dextrose equivalent (DE) of from about 1 to about 23 and, preferably, from about 9 to 15.

The gelatin utilized in the formulation of this invention can be any food-grade gelatin conventionally employed in food products. Typically, the gelatin will be a pork Type A (acid form) gelatin having a bloom in the range of 100 to 300. In general, however, the gelatin can be prepared from any collagen source, including bone and hide, and can be derived from any suitable animal, including beef and pork sources. Both acid and base processed gelatins are suitable.

The frozen confection formulation of this invention contains a food acid in an amount effective to produce a pH of from 2.5 to 4.5. Suitable acids include adipic, citric, fumaric, malic and tartaric, with citric being preferred. A buffer may also be included to maintain a desired acidic pH during all phases of processing. Suitable buffers include sodium citrate, disodium phosphate, potassium phosphate, sodium tartrate, etc.

The frozen confection formulation additionally contains natural gum stabilizers at from 0.04 to 0.6% by weight. Suitable stabilizers include algin, carrageenan, xanthan, locust bean gum, guar gum and the like and combinations thereof. A combination of guar and locust bean gum is preferred.

While the formulations of this invention are free of added sugars, fruit or vegetable juice solids may be present at a level of from about 1 to 4% by weight. These juice solids are added primarily to increase the solid level in the formulation and may also be used to add sweetness, flavor and/or color to the formulation. Juice solids provide an excellent source of natural solids which can also provide a beneficial textural effect to the frozen confection. Juice solids from pear, watermelon, orange, grape and the like may be used. The juices may or may not characterize the actual flavor of the frozen confection. In process, the juice solids will typically be added in the form of juice concentrates. Pear juice provides a preferred source of low-flavor, low color, economical, juice solids which can be combined with natural and/or artificial flavors and/or colors to achieve a desired product flavor.

The no sugar added frozen confection formulations of this invention will contain an intensive sweetener, such as aspartame, at a level of from 0.03 to 1% by weight. Intensive sweeteners such as saccharin, acesuflame, chalcone, dipeptide sweeteners, cyclamates, stevioside may be used alone or in combination.

In order to preserve a low calorie level of from 0.2 to 0.3 calories per gram, the frozen confection must have a solids level of from about 4 to 8% by weight and a water level of from 92 to 96% by weight. Sugars or sugar alcohols are, therefore, not present as added ingredients in the formulations of this invention. Proteins and fats are essentially absent in the formulation of this invention, except for such amounts which might be inherently present in the juice solids. Low-calorie bulking agents are also absent from the frozen confection formulations of this invention as such materials would add costs to the formulation without significantly improving the texture of the quiescently-frozen, non-aerated confection.

The frozen confections of this invention will typically be frozen and carried on a stick and marketed as frozen novelties. The confection may be coated or glazed with water in order to increase frozen storage stability. Water added as mere coating is not considered as a confection ingredient for purposes of calculating weight percents.

The common ingredients which can be included in the formulations of this invention include colors and flavors. Natural flavors and/or color may be utilized in the formulations.

Conventional processing steps, well-known to those skilled in the art of frozen novelties may be utilized to produce the quiescently-frozen, non-aerated confections of this invention. Typically, first the gelatin and then the other dry ingredients are dissolved in water, or a water-juice mixture, at a temperature of about 160° to 180° F. (70° to 82° C.). A pasterization step may be employed if there are any microbiological concerns. The aqueous mix is then cooled, such as in one or more swept-surface heat exchangers. No air is pumped into the aqueous mix nor are any ice crystals formed in the mix prior to molding. The cooled mix is pumped to molds which are then conveyed through a freezing bath or tunnel. When the mix is partially frozen, sticks may be inserted into each filled mold. The mix is frozen to a temperature of less then 10° F. (−10° C.), removed from the mold and then, if desired, dipped in water to produce an ice coating.

The products produced in accordance with the invention have remarkably-pleasing and soft texture relative to other low solids ice pops and are relatively nonbrittle compared to conventional ice pops.

This invention is further described, but not limited, by the following example:

EXAMPLE

A non-aerated, quiescently-frozen confection was prepared containing the following ingredients.

| Ingredient | Parts by Weight |
| --- | --- |
| Water | 91.6 |
| Pear Juice Concentrate (70° Brix) | 4.0 |
| Maltodextrin (10 D.E.) | 1.5 |
| Glycerin | 1.3 |
| Gelatin | 0.5 |
| Citric Acid | 0.5 |
| Aspartame | 0.06 |
| Guar Gum | 0.06 |
| Locust Bean Gum | 0.02 |
| Cherry Flavors/Colors | 0.06 |

The product was produced by adding water, then glycerine, then pear juice concentrate to a tank. The dries (i.e. maltodextrin, gelatin, citric acid, aspartame, guar gum, locust bean gum and colors) were dry belended, slowly added to the tank and mixed for five minutes. Thereafter, the flavors were added and mixing was continued for an additional five minutes. The mix was then pasteurized at 180° F. (82.2° C.) for 30 seconds and cooled to about 40° F. (4.4° C.). The cooled mix was then poured into pop shaped molds and frozen by passing the molds through a −40° F. (−40° C.) brine tank. The frozen pops were removed from the molds, dipped in a water bath to produce an ice coating and packaged. The pops had a pleasing texture, were soft in comparison to other low-solids pops and were less brittle in comparison to conventional ice pops.

We claim:

1. A low-calorie, low-solids, non-aerated, quiescently-frozen confection composition having a soft, non-brittle texture comprised of, on a weight basis: water at from 92 to 96%, maltodextrin at from 1 to 2.5%, juice solids at from 1 to 4%, glycerine at from 1 to 2%, gelatin at from 0.3 to 0.8%, intensive sweetener at from 0.3 to 0.1%, natural gum stabilizers at from 0.04 to 0.6%, and sufficient food acid to effect a pH of from 2.5 to 4.5, wherein the confection is essentially protein-free, is free of added sugars, sugar alcohols or low-calorie bulking agents and has a caloric density of from 0.2 to 0.3 calories per gram, wherein the weight ratio of maltodextrin to gelatin is from 2–5 to 1, and the weight ratio of maltodextrin to glycerin is from 0.5 to 2.5.

2. The composition of claim 1 wherein the weight ratio of maltodextrin to gelatin is about 3 to 1.

3. The composition of claim 2 wherein the maltodextrin level is about 1.5%.

4. The composition of claim 1 wherein the weight ratio of maltodextrin to glycerin is 1–2 to 1.

5. The composition of claim 4 wherein the weight ratio of maltodextrin to glycerin is about 1.2 to 1.

* * * * *